Inventors:
Hans A. Bakke
Allen G. Stimson
by Robert L. Peck
Their Attorney

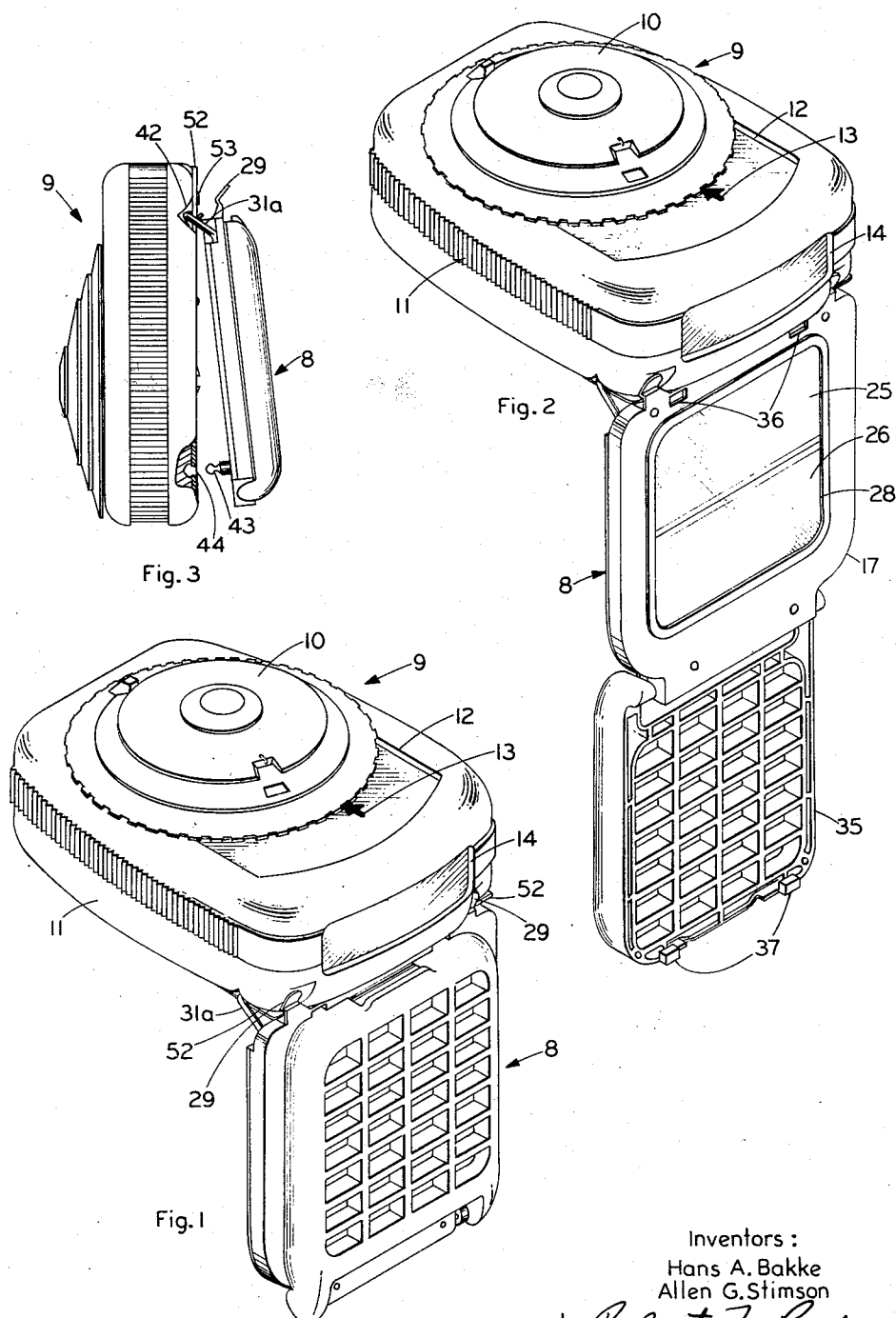

Sept. 13, 1960 H. A. BAKKE ET AL 2,952,184
BOOSTER CELL AND EXPOSURE METER
Filed Aug. 29, 1957 3 Sheets-Sheet 3

Inventors:
Hans A. Bakke
Allen G. Stimson
by Robert J. Peck
Their Attorney

United States Patent Office 2,952,184
Patented Sept. 13, 1960

2,952,184

BOOSTER CELL AND EXPOSURE METER

Hans A. Bakke, Swampscott, Mass., and Allen G. Stimson, Rochester, N.Y., assignors to General Electric Company, a corporation of New York Filed Aug. 29, 1957, Ser. No. 681,058

9 Claims. (Cl. 88—23)

This invention relates to a booster cell for an exposure meter and has for its principal object the provision of a compact, handy light-responsive cell that may be used with an exposure meter to extend its range.

In one form of the invention, the booster cell may be carried by the user as an accessory device and attached to the exposure meter only as desired, or it may be mounted on the exposure meter at all times, ready for use. In either event, once the booster cell is mounted on the exposure meter, it may be moved to either an operable or inoperable position.

In the inoperable position, the booster cell is folded neatly against the back of the exposure meter housing where it can remain until needed, without interfering with normal use of the meter. To use the booster cell, it is only necessary to swing it out from its inoperable position until it faces in the same general direction as does the internal cell, at which point it snaps into engagement with a pair of contacts that automatically connect it to the deflecting mechanism of the exposure meter. When not needed, the booster cell may be easily returned to its inoperable position, or removed completely from the meter, either action being accompanied by automatic disengagement from the measuring circuit of the meter.

The object of the invention, together with its benefits and advantages, will be best understood upon reference to the following detailed description, particularly when taken in conjunction with the drawings annexed hereto, in which:

Figure 1 is a perspective view of the booster cell attached to an exposure meter in its operable position, showing the front of the exposure meter and the window through which light passes to the internal cell;

Figure 2 is a view similar to Figure 1 in which the baffle in the booster cell has been swung away to fully expose the light-responsive surface of the cell;

Figure 3 is a side view of the arrangement shown in Figure 1 in which the booster cell has been swung down from its operable position;

Figure 4:
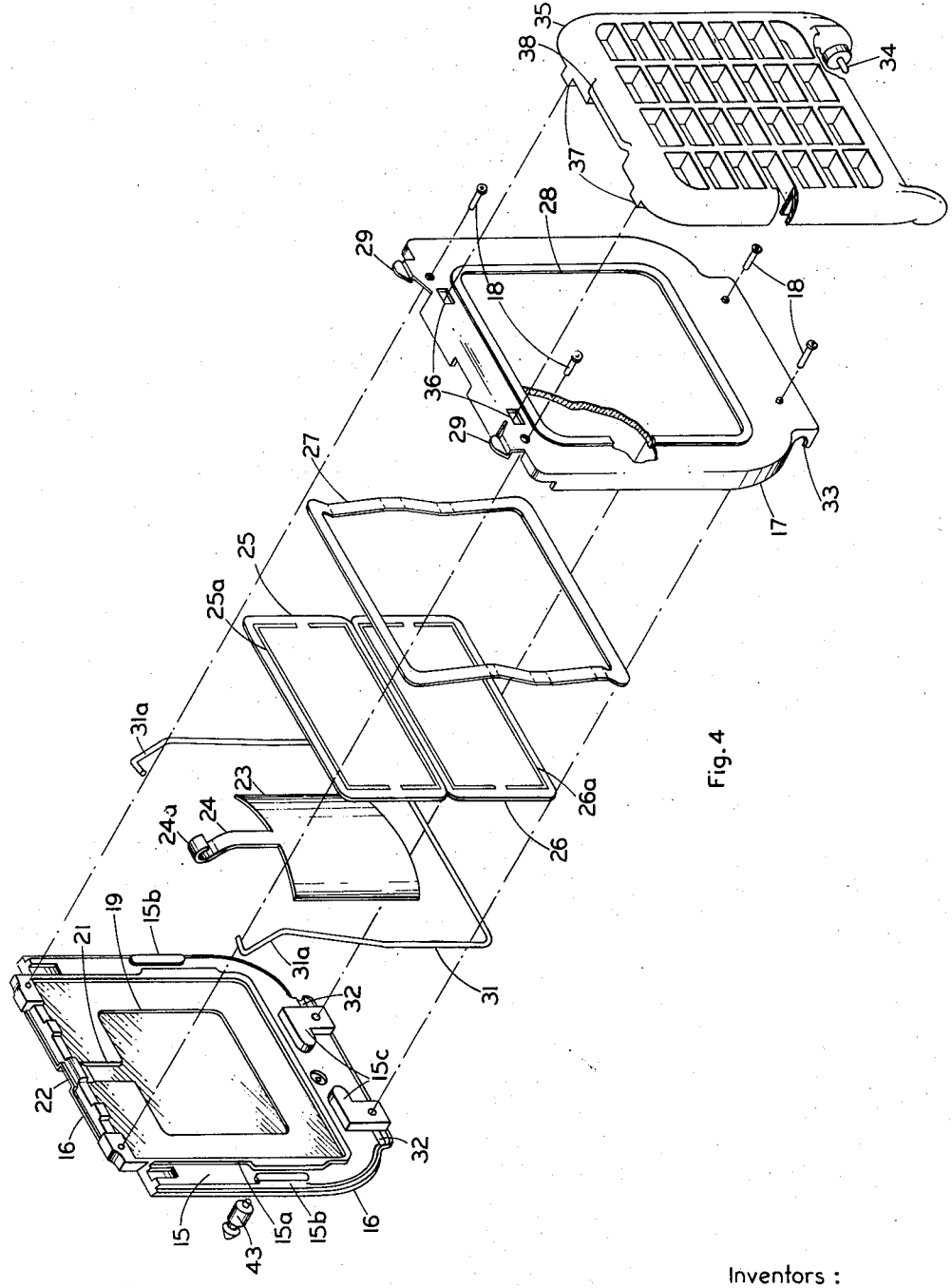
Figure 4 is an exploded perspective view of the booster cell.

Referring first to Figure 1, the booster cell is shown at 8 being attached to an exposure meter generally indicated at 9 and of the type having a calculator assembly 10 mounted on the front of the housing 11 which also has a window 12 formed in its front surface through which is visible a pointer 13. A window 14 in the end of the housing allows light to pass into the exposure meter where it strikes the surface of a suitable light-responsive cell mounted therein.

The exposure meter 9 may be of the type described in the co-pending application, Serial No. 680,099, of Hans A. Bakke et al., entitled "Exposure Meter," and assigned to the same assignee to which the present application is assigned, or it may be of the type shown in Stimson et al. Patent No. 2,648,254 which also is assigned to the same assignee. As a matter of fact, the booster cell can be used in conjunction with any conventional exposure meter and save for a limited discussion of the internal connections for the booster cell (which will be treated in detail below), further detailed description of the exposure meter will be dispensed with since such devices are well understood and need not be elaborately described herein. Suffice to say that the pointer 13 cooperates with the calculator assembly 10 to give an indication of exposure data, the pointer being part of an electro-responsive deflective mechanism which is connected in the known manner to a conventional light-responsive cell of the photovoltaic type.

Booster cell 8 will extend the range of its associated exposure meter, being particularly useful where the light is dim and upon reference to Figure 4, it is seen that the cell comprises a base member 15 formed by molding a suitable plastic material and provided with an outwardly extending flange 16 around most of its periphery which serves as a seat for the metallic coverplate 17 permanently mounted thereon by means of rivets 18 or the like.

Centrally disposed in base member 15 is a recess 19 having a channel 21 opening outwardly along its upper edge with the channel extending through the edge to form an aperture 22. Mounted within recess 19 is a back contact in the form of the bowed resilient member 23 which has a tongue portion 24 lying in recess 21 with the hooked end 24a extending out of the aperture 22 formed along the upper edge of base 15.

The light-responsive cell is shown as a pair of rectangular members 25, 26, both of which may be of the photovoltaic type and each having a back contact on its under surface and a front contact 25a and 26a respectively, around the peripheral edge of its light-responsive front surface. Although the booster cell is shown with two similar cells arranged to be connected in parallel, it is to be understood that one large cell could be used in their place, although in low-cost mass production of photoelectric cells it has been found that a more uniform performance is usually achieved through random selection of a pair of cells.

Overlying the front contacts of the two cells is a spring member 27 which has offset portions on opposite legs provided to insure good electrical contact with the cells.

The cover 17 is provided with a window 28 which overlies the light-responsive surface of the cells 25 and 26 and when the cover is assembled to the base, the spring members 23 and 27 are deformed to get good contact with both sides of the photovoltaic cells and between the spring member 27 and cover 17. The cover 17 is formed of electro-conductive material and it has a pair of ears 29 spaced along its upper edge which form one contact for the assembled booster cell, the other contact of the assembly being the hooked portion 24a which extends through the upper edge of base 15 and lies between ears 29.

Also confined within the booster cell upon assembly of the cover to the base is a U-shaped spring member 31 which has the outer extremities of its legs in the form of hinge portions 31a. It is to be noted that the base is formed with an upstanding flange 15a whose inner surface surrounds and retains the cells 25, 26 with the spring member 31 surrounding its outer surface and being retained thereby with the cooperation of the upstanding projections 15b and 15c molded as a part of base member 15.

Base 15 is also provided with a pair of substantially semi-circular slots 32 extending outwardly from the sides of the projections 15c and located so as to cooperate with the substantially semi-circular cutouts 33 formed on opposite sides of the lower edge of cover 17 which together function as a bearing for the pins 34 molded as a part of baffle 35 carried on the booster cell. On the upper edge of cover 17 is a pair of apertures 36 which are adapted to receive the inwardly projecting portions 37 spaced along the upper edge of baffle 35. These projections are press fit into the apertures to hold the baffle along the light-responsive surface of the booster cell, there being a suitable lip 38 formed along the upper edge of the booster cell to permit separation of the baffle from the cover to allow the baffle to swing downwardly and fully expose the light-responsive surface. The closed position of the baffle is shown in Figures 1 and 3 with the open position shown in Figure 2.

Figure 5:
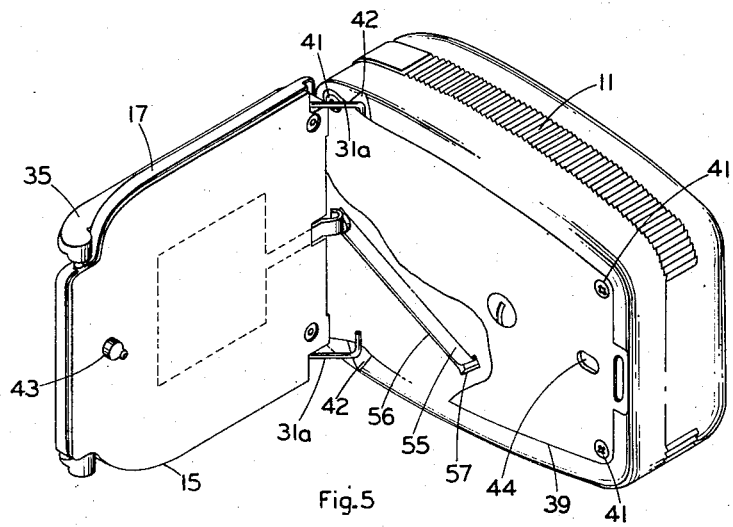
Figure 5 is a view showing an arrangement similar to Figure 1 but looking at the back of the exposure meter and booster cell, with a portion of the backplate of the meter cut away.

Referring now to Figure 5, it is seen that the exposure meter 9 has a backplate 39 permanently affixed to the back of the exposure meter housing by means of suitable screws 41 or the like. Proximate to the upper edge of backplate 39, the housing 11 is cut away at 42 to accommodate the hinge portions 31a to thereby pivotally mount the booster cell on the exposure meter. Since the hinge portions are formed as the extremities of the resilient U-shaped member 31, and because the legs of the U-shaped member are not rigidly confined within the booster cell throughout their length, the hinge portions may be separated slightly to allow the booster cell to be readily attached to the exposure meter or detached therefrom. The legs of the U-shaped member are biased in such a manner that the hinge portions will grip opposite edges of backplate 39 to hold the booster cell on the exposure meter once it has been attached. However, the arrangement is such that simple manipulation of either one of the hinge portions will be sufficient to pull it outwardly over the edge of the backplate, after which the booster cell is readily slipped off of the exposure meter.

Once the booster cell has been clipped onto the exposure meter, it may be carried thereon folded down against the back side of the exposure meter, being spaced from the backplate 39 but clamped relative to the backplate by means of the coaction between the detent pin 43 mounted on the under side of base 15 and the aperture 44 provided in plate 39 and overlying a recessed portion of the exposure meter housing.

Figure 3 shows the booster cell folded down just prior to engagement of the detent pin with the cooperating aperture. Once the pin engages the aperture, the booster cell will remain in this position. The folded down position may be regarded as an inoperable position for the booster cell in that there is no connection between the booster cell and the exposure meter. With the booster cell so mounted, the exposure meter may be used without interference by the booster cell and in those light conditions requiring use of the booster cell, it is an easy matter to disengage the detent pin from the cooperating aperture and swing the cell out to its operable position.

Figures 6, 7:
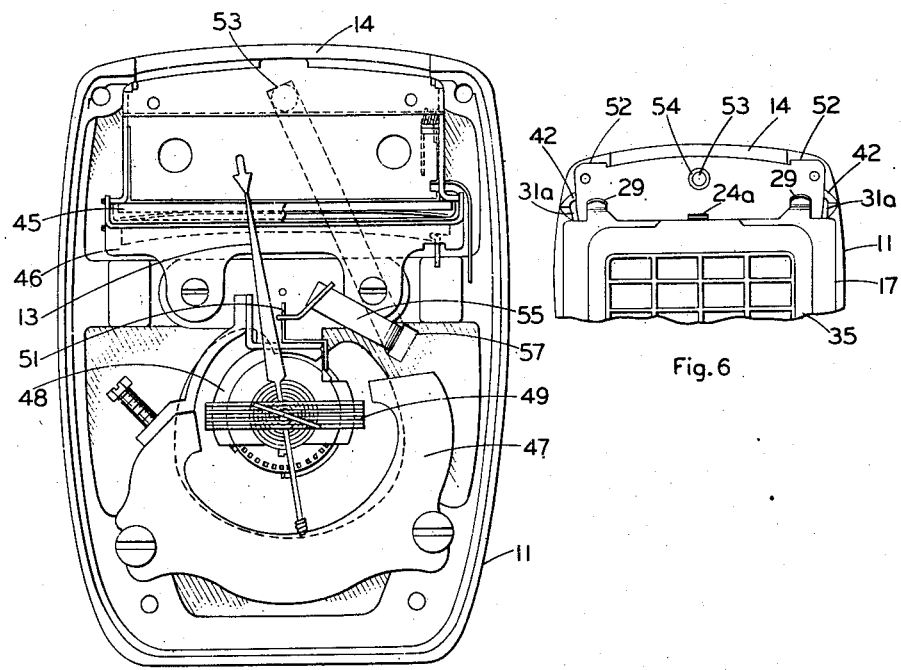
Figure 6 is a partial view, in elevation, looking at the back of the exposure meter when the booster cell is folded down to its inoperable position.
Figure 7 is a view within the exposure meter showing the internal connections for the booster cell.

When the booster cell is swung out to its operable position, its contacts automatically engage contacts forming a part of the internal connections of the exposure meter, reference now being had to Figures 5, 6 and 7 for a detailed understanding of how this automatic contact engagement occurs.

Referring first to Figure 7, which is a view within the exposure meter, and as is fully described in either the aforesaid co-pending application of H. A. Bakke or the aforesaid U.S. Patent No. 2,648,254, the internal cell forming a part of the exposure meter is shown at 45, being mounted on a bracket 46 in such a way that its light-responsive surface faces outwardly toward window 14.

The electro-responsive mechanism comprises the permanent magnet 47, the magnetic core 48, the pivotally mounted coil assembly 49 and pointer 13. One side of the internal cell is connected to backplate 39, which is formed of a suitable electro-conductive material, from which, through a conventional spiral lead-in spring, connection may be made to one side of moving coil assembly 49. The other side of the built-in cell 45 may be brought to a terminal lug 51 (such connection not being shown) with the terminal lug in turn connected to the other side of the coil assembly through another conventional spiral lead-in spring (again such connection being omitted in the interests of clarity).

To connect the booster cell to the electro-responsive mechanism and as seen in Figure 6, the upper edge of backplate 39 is formed at its corners into a pair of contact ears 52. The contact ears 29, formed on the booster cell cover, are opposite the ears formed on the backplate and when the booster cell is swung out to its operable position, the ears 29 ride over the edges of ears 52. Portions of the housing have been cut away behind the ears 52 to accommodate the contacts of the booster cell and these contacts are formed with a V-section, as is best shown in Figure 3, so that as they ride over the ears on the backplate, the parts cooperate to form a detent which assists in holding the booster cell in its operable position. As is best seen in Figure 6, the backplate 39 is outwardly flared at its edges and this construction forces the hinge portions of the booster cell outward as the booster cell is swung to its operable position to thereby create clamping forces through the hinge portions which assist in holding the booster cell in its operable position.

From the above, it is apparent that movement of the booster cell to its operable position automatically brings the contacts from one side of the booster cell into engagement with contacts forming a part of the connections to the deflection mechanism. To complete the circuit from the other side of the booster cell, a contact button 53 is mounted in the housing 11, there being an aperture 54 in backplate 39 through which the button projects. With such clearance provided between the button and the backplate, the parts are properly insulated from each other. A contacting strip 55 is connected to button 53 and lies within a channel 56 provided in the back surface of housing 11, the channel being deep enough to allow separation between strip 55 and backplate 39, there being an aperture 57 provided in the rear wall of the housing through which strip 55 extends for connection to terminal lug 51.

As the booster cell is swung out to its operable position, the hooked-over portion 24a firmly engages contact button 53 to complete the circuit from the other side of the booster cell to the deflecting mechanism and like the engagement of contacts 29 with ears 52, the engagement of hook portion 24a with button 53 is automatic.

Upon moving the booster cell to its inoperable position where it is folded against the back of the exposure meter, the contacts on the booster cell automatically disengage themselves from the exposure meter contacts and remain separated therefrom at all times.

From the above, it is seen that the booster cell, when attached to the exposure meter and folded to its inoperable position, allows for a very compact overall arrangement with its operable position being readily obtained by simply swinging it out during which it snaps into place and automatically makes electrical contact with the deflecting mechanism of the exposure meter. If desired, the baffle member may be readily swung away from the light-responsive surface of the booster cell to further increase the sensitivity or range of the exposure meter. Of course, it will be understood that when the booster cell is used to increase the sensitivity of the exposure meter, the calculator assembly will be suitably manipulated to reposition the exposure data scales in proper position for such increase in sensitivity. Such manipulation may be as provided in the aforesaid co-pending application of H. A. Bakke or it may be accomplished by other suitable means.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. In combination with an exposure meter having a light-responsive cell, an electro-responsive deflecting mechanism connected to said cell moving in response to light falling on said cell, means cooperating with said deflecting mechanism to indicate the magnitude of selected exposure factors, and a housing within which said cell and said electro-responsive mechanism are mounted and on the front cover of which is mounted said indicating means, a light-responsive booster cell pivotally mounted on the back of said housing for extending the range of said exposure meter, said booster cell being rotatable about said pivotal mounting between operable and inoperable positions, and means for automatically connecting said booster cell to said deflecting mechanism whenever said booster cell is rotated to its operable position, said automatic connecting means including a first contact member permanently connected to one side of said internal cell and one side of said deflecting mechanism, a second contact member electrically connected to one side of said booster cell, said booster cell assembly being pivotally mounted on the back side of said exposure meter and arranged contiguous thereto when in said inoperable position with its contact separated from said first contact member, said booster cell extending at right angles to said back of the housing when in said operable position with its contact engaging said first contact, and means to electrically connect the other side of said booster cell to the other side of said internal cell and the other side of said deflecting mechanism.

2. In combination with an exposure meter having a light-responsive cell, an electro-responsive deflecting mechanism connected to said cell moving in response to light falling on said cell, means cooperating with said deflecting mechanism to indicate the magnitude of selected exposure factors, and a housing within which said cell and said electro-responsive mechanism are mounted and on the front cover of which is mounted said indicating means, said housing having a window in one of its ends through which light passes to said light-responsive cell, a light-responsive booster cell detachably mounted on the back of said housing for extending the range of said exposure meter, said booster cell being pivotably mounted along an edge of said housing proximate to said window, said booster cell being rotatable about its pivot mounting between operable and inoperable positions when mounted on said housing, said booster cell and said internal cell facing in the same general direction when said booster cell is in its operable position, and means for automatically connecting said booster cell in circuit with said deflecting mechanism whenever said booster cell is moved to its operable position and for electrically disconnecting said booster cell whenever said booster cell is moved to its inoperable position, said automatic connecting means including a first electrical contact carried by said booster cell and a mating electrical contact positioned on said housing and located such as to complete an electrical circuit with said first contact upon rotation of said booster cell to its operative position, said booster cell positioning relative to said indicating means insuring that said cell can not obstruct said indicating means.

3. The combination defined by claim 2 wherein said booster cell has a baffle normally overlying its light-responsive surface, said baffle being pivotally mounted along an edge of said cell remote from said mounting connecting said booster cell to said meter, and said booster cell and said baffle having means which cooperate to hold said baffle in its normal position but which allow said baffle to be swung away from said light-responsive surface to further increase the range of said exposure meter.

4. In combination with an exposure meter having a light-responsive cell, an electro-responsive deflecting mechanism connected to said cell moving in response to light falling on said cell, means cooperating with said deflecting mechanism to indicate the magnitude of selected exposure factors, and a housing within which said cell and said electro-responsive mechanism are mounted and on the front cover of which is mounted said indicating means, a light-responsive booster cell pivotally mounted on the back of said housing for extending the range of said exposure meter, said booster cell being rotatable about the pivot mounting between predetermined operable and inoperable positions while mounted on said housing, and means for automatically connecting said booster cell in circuit with said deflecting mechanism whenever said booster cell is moved to its operable position and for electrically disconnecting said booster cell whenever said booster cell is moved to its inoperable position, said automatic connecting means including a first electrical contact carried by said booster cell and a mating electrical contact positioned on said housing and located such as to complete an electrical circuit with said first contact upon rotation of said booster cell to its operative position.

5. In combination with an exposure meter having a light-responsive cell, an electro-responsive deflecting mechanism connected to said cell moving in response to light falling on said cell, means cooperating with said deflecting mechanism to indicate the magnitude of selected exposure factors, and a housing within which said cell and said electro-responsive mechanism are mounted and on the front cover of which is mounted said indicating means, a light-responsive booster cell detachably mounted on the back of said housing for extending the range of said exposure meter, said booster cell being movable between operable and inoperable positions when mounted on said housing, and means for automatically connecting said booster cell to said deflecting mechanism whenever said booster cell is moved to its operable position, said housing having an electro-conductive backplate forming a part of the permanent connections between one side of said internal cell and one side of said deflecting mechanism, said backplate having an aperture through which protrudes a contact button insulated therefrom, said contact button being connected to a terminal forming a part of the permanent connections between the other side of said internal cell and the other side of said deflecting mechanism, said booster cell having a pair of contacts connected to opposite sides thereof, said booster cell being pivotally mounted on the back side of said exposure meter and arranged to overlie said backplate when in said inoperable position with its contacts separated from said backplate and said button, said booster cell extending at right angles to said backplate when in said operable position with its contacts respectively engaging said backplate and said contact button.

6. The combination defined by claim 5 in which said backplate has a first pair of spaced ears along an edge thereof and one of the contacts of said booster cell is in the form of a second pair of spaced ears which snap over said first pair of spaced ears when said booster cell is moved to its operable position, said first and second pairs of ears cooperating to both hold said booster cell in its operable position and maintain electrical contact between said booster cell and said backplate.

7. The combination defined by claim 6 wherein the other contact of said booster cell is in the form of a resilient tongue which engages said contact button when said first and second pairs of ears are engaged.

8. The combination defined by claim 7 wherein said backplate has a second aperture overlying a recessed portion of said housing and said booster cell has a detent pin arranged to cooperate with said second aperture when said booster cell is moved to its inoperable position, said pin snapping into said aperture to hold said booster cell in said inoperable position.

9. The combination defined by claim 8 wherein said booster cell has a pair of resiliently mounted hinges which fit behind opposite edges of said backplate, said housing being cut away to accommodate said hinges, said hinges being biased toward each other but deformable away from each other to allow said booster cell to be removed from said said exposure meter.

References Cited in the file of this patent

UNITED STATES PATENTS

| | | |
|---|---|---|
| 2,063,973 | Anderson | Dec. 15, 1936 |
| 2,129,114 | Bernhard, et al. | Sept. 6, 1938 |
| 2,297,262 | Tonnics | Sept. 29, 1942 |
| 2,408,944 | Miller | Oct. 8, 1946 |

FOREIGN PATENTS

| | | |
|---|---|---|
| 641,784 | Germany | Feb. 12, 1937 |
| 824,408 | Germany | Dec. 10, 1951 |
| 258,022 | Switzerland | Apr. 16, 1949 |